United States Patent
Gilzean et al.

(10) Patent No.: US 9,516,464 B2
(45) Date of Patent: *Dec. 6, 2016

(54) NOTIFICATION TO USERS OF EVENTS

(71) Applicant: International Business Machines Corporation, Armonk, NY (US)

(72) Inventors: Candice B. Gilzean, Cedar Park, TX (US); Gahlya Greer, Bowling Green, KY (US); Fabian F. Morgan, Austin, TX (US); Michael E. Rhodes, Pflugerville, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/059,389

(22) Filed: Mar. 3, 2016

(65) Prior Publication Data

US 2016/0192128 A1    Jun. 30, 2016

Related U.S. Application Data

(63) Continuation of application No. 14/824,218, filed on Aug. 12, 2015, now Pat. No. 9,324,061, which is a
(Continued)

(51) Int. Cl.
*H04M 3/42* (2006.01)
*H04W 4/02* (2009.01)
(Continued)

(52) U.S. Cl.
CPC ............. *H04W 4/02* (2013.01); *G06Q 10/109* (2013.01); *G06Q 10/1095* (2013.01);
(Continued)

(58) Field of Classification Search
CPC ...................................................... H04M 3/42
(Continued)

(56) References Cited

U.S. PATENT DOCUMENTS

| | | |
|---|---|---|
| 5,790,974 A | 8/1998 | Tognazzini |
| 6,333,973 B1 | 12/2001 | Smith et al. |

(Continued)

FOREIGN PATENT DOCUMENTS

| | | |
|---|---|---|
| CA | 252281 | 4/2007 |
| EP | 1164774 | 12/2001 |
| WO | 02058420 | 7/2002 |

OTHER PUBLICATIONS

Infospace.com—one-stop search [online], [retrieved on Aug. 12, 2010]. Retrieved from the Internet: <URL:http://www.infospace.com/ispace/ws/index; 1 page.
(Continued)

*Primary Examiner* — Olisa Anwah
(74) *Attorney, Agent, or Firm* — Schmeiser, Olsen & Watts, LLP; Isaac J. Gooshaw (57) ABSTRACT

A method and system. User information is received at a storage location. The user information includes meeting and notification information. User activity is monitored based on the received user information. In response to a detection of a change in user activity, a determination is made of whether the change necessitates notifying a user. The user information in the storage location is modified, based on the detected change in user activity, when the user desires to change the notification information.

20 Claims, 6 Drawing Sheets

Related U.S. Application Data continuation of application No. 14/460,406, filed on Aug. 15, 2014, now Pat. No. 9,177,301, which is a continuation of application No. 14/033,591, filed on Sep. 23, 2013, now Pat. No. 8,879,704, which is a continuation of application No. 13/491,806, filed on Jun. 8, 2012, now Pat. No. 8,666,051, which is a continuation of application No. 11/621,791, filed on Jan. 10, 2007, now Pat. No. 8,229,083.

(51) Int. Cl.
| | | |
|---|---|---|
| H04W 4/14 | (2009.01) | |
| H04M 3/56 | (2006.01) | |
| G06Q 10/10 | (2012.01) | |
| H04W 4/12 | (2009.01) | |
| H04W 8/18 | (2009.01) | |
| H04W 72/00 | (2009.01) | |
| H04L 29/08 | (2006.01) | |

(52) U.S. Cl.
CPC .......... *H04L 67/1097* (2013.01); *H04L 67/22* (2013.01); *H04M 3/565* (2013.01); *H04W 4/12* (2013.01); *H04W 4/14* (2013.01); *H04W 8/18* (2013.01); *H04W 72/005* (2013.01)

(58) Field of Classification Search
USPC ............................ 379/88.12, 93.21, 201.01, 202.01,379/204.01, 207.03, 158; 455/416; 709/224
See application file for complete search history.

(56) References Cited

U.S. PATENT DOCUMENTS

| | | | |
|---|---|---|---|
| 6,411,605 | B1 | 6/2002 | Vance et al. |
| 6,496,568 | B1 | 12/2002 | Nelson |
| 6,556,586 | B1 | 4/2003 | Sipila |
| 6,658,093 | B1 | 12/2003 | Langseth et al. |
| 7,072,359 | B2 | 7/2006 | Uchida et al. |
| 7,428,302 | B2 | 9/2008 | Zirngibl et al. |
| 7,567,657 | B2 | 7/2009 | Foxenland |
| 7,653,193 | B2 | 1/2010 | Pfleging et al. |
| 7,778,629 | B2 | 8/2010 | Gilzean et al. |
| 8,666,051 | B2 | 3/2014 | Gilzean et al. |
| 8,879,704 | B2 | 11/2014 | Gilzean et al. |
| 9,177,301 | B2 | 11/2015 | Gilzean et al. |
| 2003/0053612 | A1 | 3/2003 | Henrikson et al. |
| 2003/0088427 | A1 | 5/2003 | Elsey et al. |
| 2003/0224811 | A1 | 12/2003 | Jain et al. |
| 2004/0116119 | A1 | 6/2004 | Lewis et al. |
| 2005/0018826 | A1 | 1/2005 | Benco et al. |
| 2005/0027608 | A1 | 2/2005 | Wiesmuller et al. |
| 2005/0078612 | A1 | 4/2005 | Lang |
| 2005/0227680 | A1 | 10/2005 | Snowden |
| 2005/0256754 | A1* | 11/2005 | Nastacio .............. G06Q 10/109 705/7.19 |
| 2006/0212330 | A1 | 9/2006 | Savilampi |
| 2006/0234734 | A1 | 10/2006 | Kim |
| 2007/0094661 | A1 | 4/2007 | Baird et al. |
| 2008/0167005 | A1 | 7/2008 | Gilzean et al. |
| 2014/0358615 | A1 | 12/2014 | Gilzean et al. |
| 2015/0347986 | A1 | 12/2015 | Gilzean et al. |

OTHER PUBLICATIONS

Adolfsson, Marcus; (Still Unofficial Guide to GPRS [online], Treocentral, Oct. 1, 2002 [retrieved on Aug. 12, 2010]. Retrieved from the Internet: <URL: http://www.treocentral.com/content/Stories/149-2.htm; 3 pages.
PCT International Search Report and Written Opinion; dated Jun. 3, 2008. 17 pages.
Office Action (Mail Date Aug. 23, 2011) for U.S. Appl. No. 11/621,791, filed Jan. 20, 2007.
Amendment filed Nov. 22, 2011 in response to Office Action (Mail Date Aug. 23, 2011) for U.S. Appl. No. 11/621,791, filed Jan. 20, 2007.
Office Action (Mail Date Dec. 5, 2011) for U.S. Appl. No. 11/621,791, filed Jan. 20, 2007.
Amendment filed Feb. 29, 2012 in response to Office Action (Mail Date Dec. 5, 2011) for U.S. Appl. No. 11/621,791, filed Jan. 20, 2007.
Notice of Allowance (Mail Date Mar. 16, 2012) for U.S. Appl. No. 11/621,791, filed Jan. 20, 2007.
RCE (Sep. 16, 2013) for U.S. Appl. No. 13/491,806, filed Jun. 8, 2012.
Notice of Allowance (Mail Date Jul. 18, 2013) for U.S. Appl. No. 13/491,806, filed Jun. 8, 2012.
Response (Jul. 8, 2013) for U.S. Appl. No. 13/491,806, filed Jun. 8, 2012.
Office Action (Mail Date May 13, 2013) for U.S. Appl. No. 13/491,806, filed Jun. 8, 2012.
Response (Apr. 24, 2013) for U.S. Appl. No. 13/491,806, filed Jun. 8, 2012.
Office Action (Mail Date Jan. 30, 2013) for U.S. Appl. No. 13/491,806, filed Jun. 8, 2012.
Office Action (Mail Date Nov. 20, 2009) for U.S. Appl. No. 11/621,791, filed Jan. 20, 2007.
Notice of Allowance (Mail Date Apr. 2, 2010) for U.S. Appl. No. 11/621,832, filed Jan. 10, 2007.
Response (Filed Feb. 23, 2010) for U.S. Appl. No. 11/621,832, filed Jan. 10, 2007.
Office Action (Mail Date Nov. 20, 2009) for U.S. Appl. No. 11/621,832, filed Jan. 10, 2007.
Response (Filed Sep. 15, 2009) for U.S. Appl. No. 11/621,832, filed Jan. 10, 2007.
Restriction Requirement (Mail Date Aug. 20, 2009) for U.S. Appl. No. 11/621,832, filed Jan. 10, 2007.
Publication (Mail Date Jul. 28, 2008) for U.S. Appl. No. 11/621,832, filed Jan. 10, 2007.
Notice of Allowance (Mail Date Oct. 15, 2013) for U.S. Appl. No. 13/491,806, filed Jun. 8, 2012, First Named Inventor Candice B. Gilzean.
Notice of Allowance (Mail Date Jul. 2, 2014) for U.S. Appl. No. 14/033,591, filed Sep. 23, 2013.
Final Amendment (filed Jun. 16, 2014) for U.S. Appl. No. 14/033,591, filed Sep. 23, 2013.
Final Office Action (Mail Date Apr. 17, 2014) for U.S. Appl. No. 14/033,591, filed Sep. 23, 2013, First Named Inventor Candice B. Gilzean.
Amendment (filed Apr. 8, 2014) for U.S. Appl. No. 14/033,591, filed Sep. 23, 2013, First Named Inventor Candice B. Gilzean.
Office Action (Mail Date Jan. 16, 2014) for U.S. Appl. No. 14/033,591, filed Sep. 23, 2013, First Named Inventor Candice B. Gilzean.
Notice of Allowance (Jun. 25, 2015) for U.S. Appl. No. 14/460,406, filed Aug. 15, 2014.
Final Office Action (Apr. 17, 2015) for U.S. Appl. No. 14/460,406, filed Aug. 15, 2014.
Final Amendment (Jun. 16, 2015) for U.S. Appl. No. 14/460,406, filed Aug. 15, 2014.
Amendment (Mar. 4, 2015) for U.S. Appl. No. 14/460,406, filed Aug. 15, 2014.
Office Action (Dec. 12, 2014) for U.S. Appl. No. 14/460,406, filed Aug. 15, 2014.
Amendment (Dec. 3, 2014) for U.S. Appl. No. 14/460,406, filed Aug. 15, 2014.
Office Action (Sep. 11, 2014) for U.S. Appl. No. 14/460,406, filed Aug. 15, 2014.
Office Action (Oct. 8, 2015) for U.S. Appl. No. 14/824,218, filed Aug. 12, 2015.
Amendment (Jan. 4, 2016) for U.S. Appl. No. 14/824,218, filed Aug. 12, 2015.
Notice of Allowance (Jan. 29, 2016) for U.S. Appl. No. 14/824,218, filed Aug. 12, 2015.

(56) References Cited

OTHER PUBLICATIONS 312 amendment (Feb. 5, 2016) for U.S. Appl. No. 14/824,218, filed Aug. 12, 2015.
Preliminary amendment (Sep. 10, 2015) for U.S. Appl. No. 14/824,218, filed Aug. 12, 2015.

* cited by examiner

NOTIFICATION TO USERS OF EVENTS

This application is a continuation application claiming priority to Ser. No. 14/824,218, filed Aug. 12, 2015, now U.S. Pat. No. 9,324,061 issued Apr. 26, 2016, which is a continuation of Ser. No. 14/460,406, filed Aug. 15, 2014, U.S. Pat. No. 9,177,301, issued Nov. 3, 2015, which is a Continuation of Ser. No. 14/033,591, filed Sep. 23, 2013, U.S. Pat. No. 8,879,704, issued Nov. 4, 2014, which is a continuation application claiming priority to Ser. No. 13/491,806, filed Jun. 8, 2012, U.S. Pat. No. 8,666,051, issued Mar. 4, 2014, which is a continuation of application to Ser. No. 11/621,791, filed Jan. 10, 2007, U.S. Pat. No. 8,229,083, issued Jul. 24, 2012.

FIELD OF THE INVENTION

This invention relates to a method and system for conveying messages to a user related to previously scheduled events and in particular to a method and system for transmitting text messages to a user who is not using or in close proximity to a stationary or semi-stationary computing device. The transmission being a text message sent to a mobile computing device that is possessed or that in close proximity to the user.

BACKGROUND OF THE INVENTION

Computer Supported Coorporative Work (CSCW) addresses "how collaborative activities and their coordination can be supported by means of computer systems." On the one hand, many authors consider that CSCW and groupware are synonyms. CSCW is a generic term, which combines the understanding of the way people work in groups with the enabling technologies of computer networking, and associated hardware, software, services and techniques. Groupware can be divided into three categories depending on the level of collaboration—communication tools, conferencing tools and collaborative management (Co-ordination) tools. Electronic communication tools send messages, files, data, or documents between people and hence facilitate the sharing of information. Examples include: email, instant messaging, faxing, voice mail and web publishing. Electronic conferencing tools facilitate the sharing of information, but in a more interactive way. Examples include: Internet forums (also known as message boards or discussion boards)—a virtual discussion platform to facilitate and manage online text messages;

Chatting—a virtual discussion platform to facilitate and manage real-time text messages;

Telephony—telephones allow users to interact;

Video conferencing—networked PCs share video and audio signals;

Data conferencing—networked PCs share a common whiteboard that each user can modify;

Application sharing—users can access a shared document or application from their respective computers simultaneously in real time; Electronic meeting systems (EMS)—a conferencing system built into a room. The special purpose room will usually contain a large video projector interlinked with numerous PCs.

Collaborative management tools facilitate and manage group activities. Examples include: electronic calendars (also called time management software)—schedule events and automatically notify and remind group members; project management systems—schedule, track, and chart the steps in a project as it is being completed; workflow systems—collaborative management of tasks and documents within a knowledge-based business process; knowledge management systems—collect, organize, manage, and share various forms of information; extranet systems (sometimes also known as 'project extranets')—collect, organize, manage and share information associated with the delivery of a project (eg: the construction of a building); social software systems—organize social relations of groups; online spreadsheets—collaborate and share structured data and information. Collaborative software can be either web based (such as UseModWiki or Scoop), or desktop systems (such as CVS or RCS).

A conference call is a telephone call where the calling party wants to have more than one called party listen in to the audio portion of the call. The conference call may be designed to allow the called party to also talk during the call, or the call may be set up so that the called party merely listens into the call but cannot speak. It is often referred to as an ATC (Audio Tele-Conference). These conference calls are a convenient way for many people to conduct business affairs while being in different physical locations. Even the technology for conference calls has progressed to the point that many users have systems that remind them of scheduled calls and prompt them immediately before a scheduled telephone conference is to occur. Some of these conference notification systems automatically remind the user of a scheduled teleconference.

At certain times, the currently available reminder capability for conference calls or other meetings in collaboration tools (such as Lotus Notes) are insufficient. The basic problem is that they require the user to be using the computer or be near it, in order to be alerted about an upcoming meeting. Consider the following cases where that requirement is problematic for obtaining the alert:

The user has left his/her laptop locked in an office and is collaborating with fellow coworkers on the design of some new architecture in a conference room. Or, as another example, the user is attending a department celebration such as a major project delivery or a coworker retirement, etc. in a conference room and has left his/her laptop in an office.

The user may have been stopped in the hallway and asked about a solution to some problem, and as a result of the ensuing discussion, may have forgotten about an upcoming meeting.

In the user's current time zone, the meeting is scheduled for early afternoon, but because the user has flown to another location to work on another project, the meeting may occur while the user is out at lunch in the new time zone, or early in the morning while the user is still getting dressed for work, for example.

The user may be in a taxi on the way to/from an airport or may be in some other capacity where he/she is not likely to have a laptop open. While the user may not want to take a confidential call in these instances, there are non-confidential calls and non-participatory calls that the user might want to take in these instances, such as an overview of the new features and advantages of a recently released software product from IBM, for example.

These scenarios highlight the problems associated with notifying a user of a conference call when that user is away from his/her computer. There remains a need for a means to connect to or be reminded of a conference call or meeting while the user is away from his/her computer.

SUMMARY OF THE INVENTION

The present invention provides a method and system that sends text messages to users via mobile devices when the user is away from his/her office or main computer device. The invention comprises an enhancement to mobile device (cell phone, BlackBerry, Palm Pilot, etc.) software and an enhancement to collaboration tool (such as Lotus Notes) software for the integration of this new feature. The invention provides the option for the user to be notified by SMS on a mobile device of an upcoming conference call/meeting. However, because it is designed to alleviate the problems above where the user is away from the computer, the invention also allows the conference call number and pass code (if required) to be sent as part of the SMS message, and the mobile device software to be enhanced as to provide the following option:

Upon receipt of one of these messages, the enhanced mobile device software would automatically connect to the specified conference call number after some preconfigured time interval, for example 15 seconds. This time interval would be one of the preference settings for the mobile device software.

In the method of the present invention, there is an initial system setup. This step involves the sending of a test message to determine whether the user's portable device can receive text messages in this system. Once the initial setup is complete, the user device is then capable of receiving text messages related to scheduled telephone conferences. A second step is to input into the system the telephone conference schedule and any travel plans of the user. Once this information is in the system, it is used to determine if there is a change in the user schedule that necessitates a change in a scheduled notification of the user. For example, if a user is scheduled to be in a different time zone at the time of the meeting, the system could prompt the user to determine if the user wanted a pre-conference notification. The third step would be to send the meeting text message notification at the appropriate time to the user via the user's mobile device such as the user's PDA or cellular telephone device.

An additional and optional enhancement provides the integration of the collaboration tool with an employee online travel reservation tool. With this integration, the collaboration tool, upon acceptance of a received meeting invite by the user or after the user has created a new appointment in the calendar, can prompt the user if he/she would like the enhanced reminder. This prompt would occur if the invention detects that the user will be in a new time zone by the time the meeting starts, and if the meeting in that new time zone would be at a time when the user is likely to be away from the computer.

DETAILED DESCRIPTION OF THE INVENTION

The present invention incorporates Short Message Service technology to enable a user to receive information in a text message format. Short Message Service (SMS) is a service available on most digital mobile phones (and other mobile devices, e.g. a Pocket PC, or occasionally even desktop computers) that permits the sending of short messages (also known as text messages, or more colloquially SMSes, texts or even txts) between mobile telephones, other handheld devices and even landline telephones.

Messages are sent to a Short Message Service Centre (SMSC) which provides a store-and-forward mechanism. It attempts to send messages to their recipients. If a recipient is not reachable, the SMSC queues the message for later retry. Some SMSCs also provide a "forward and forget" option where transmission is tried only once. Both Mobile Terminated (MT), for messages sent to a mobile handset, and Mobile Originating (MO), for those that are sent from the mobile handset, operations are supported. Message delivery is best effort, so there are no guarantees that a message will actually be delivered to its recipient and delay or complete loss of a message is not uncommon, particularly when sending between networks. Users may choose to request delivery reports, which can provide positive confirmation that the message has reached the intended recipient, but notifications for failed deliveries are unreliable at best.

Transmission of the short messages between SMSC and phone can be done through different protocols such as SS7 within the standard GSM MAP framework or TCP/IP within the same standard. Messages are sent with the additional MAP operation forward short message, whose payload length is limited by the constraints of the signalling protocol to precisely 140 bytes (140 bytes=140*8 bits=1120 bits). In practice, this translates to either 160 7-bit characters, 140 8-bit characters, or 70 16-bit characters.

Figure 1:
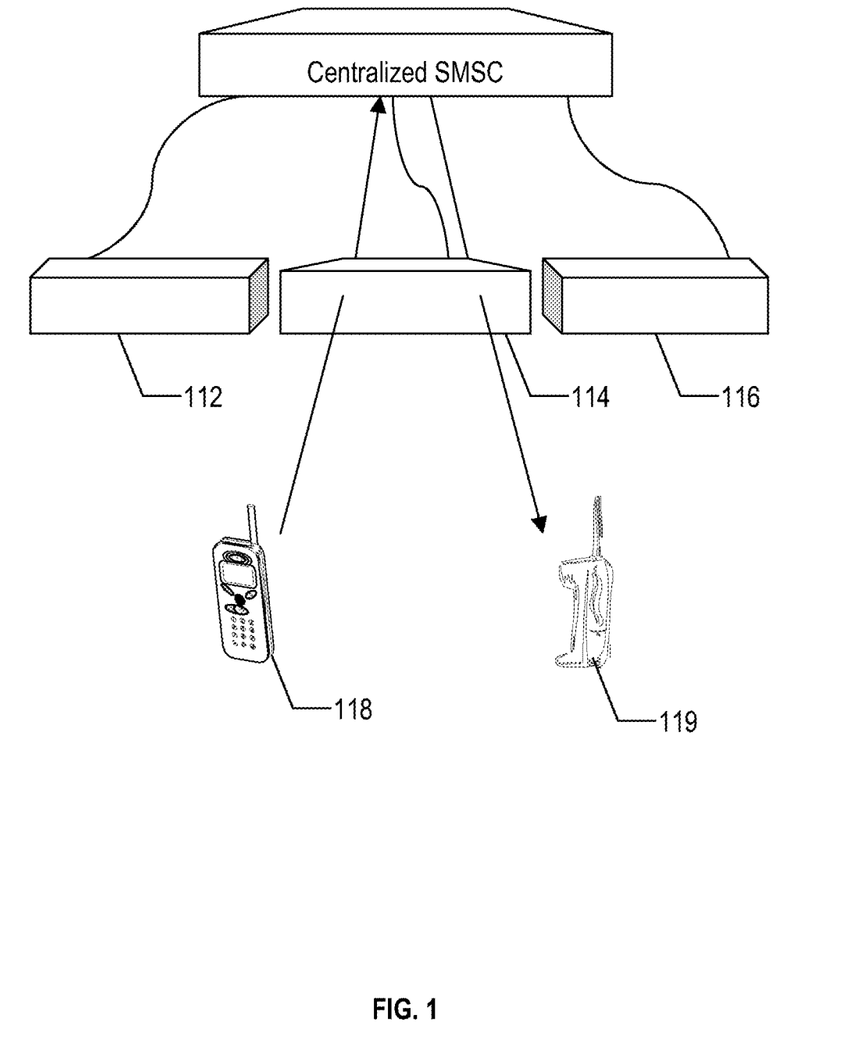
FIG. 1 is an illustration of a Short Message System (SMS) capable of sending text messages to a mobile device.

FIG. 1 is an illustration of a typical Short Message System (SMS) configuration capable of sending text messages to a mobile device. This configuration comprises a centralized control center SMSC 110, control towers 112, 114, and 116, and the mobile electronic devices 118 and 119 possessed by the end user. In addition to these electronic mobile devices other computing devices such as personal computers (PCs) and laptop computers are capable of sending and receiving text messages via the SMS technology. In the SMS, the user will formulate and send the message through electronic device 118. This message travels through a channel to the control tower 114 that is the closest in proximity to the electronic device 118. The message is then sent from the control tower 114 to the central control center SMSC 110. The SMSC stores the message and transmits the message via control tower 114 to the recipient electronic device 119. In this example, because of the location of the both electronic devices, control tower 114 interacted with devices 118 and 119. However, in other cases different control towers will be used to transmit and receive messages.

Figure 2:
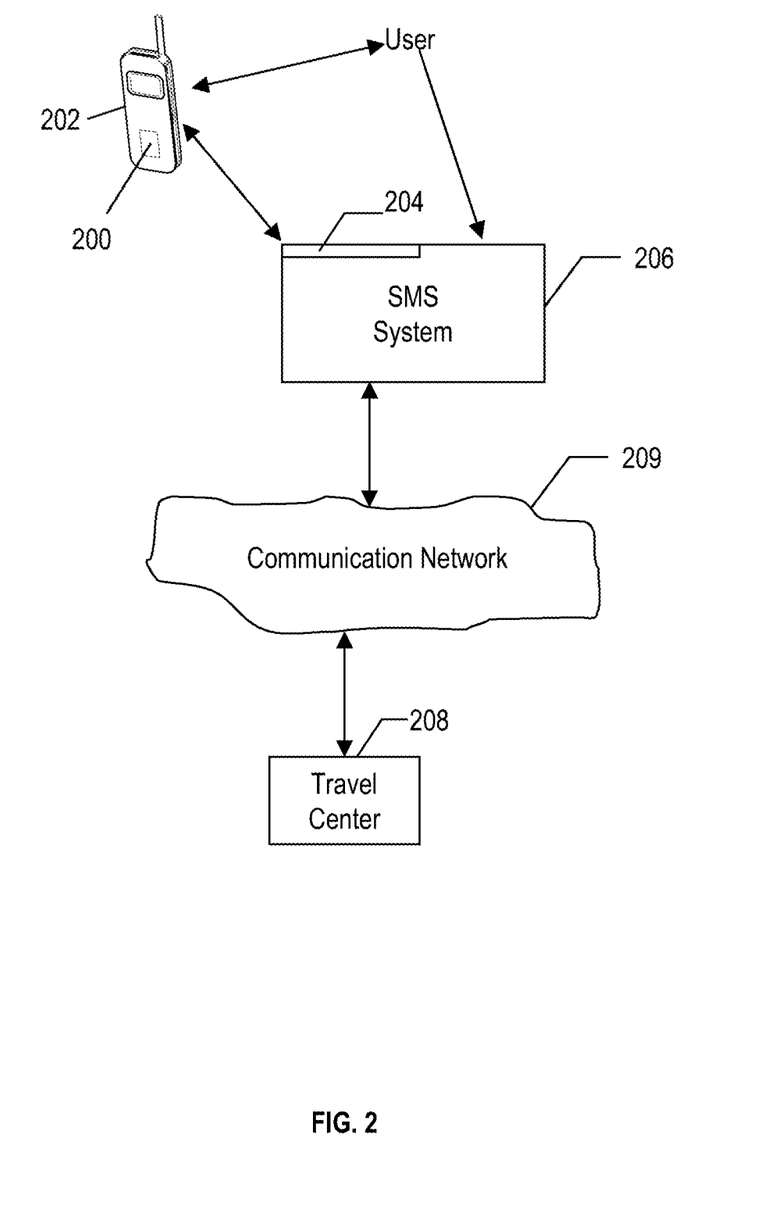
FIG. 2 is an illustration of a configuration of the system of the present invention.

FIG. 2 illustrates a configuration of the telephone conference notification and connection system of the present invention. The invention comprises a software enhancement 200 to software 202 in a mobile device (cell phone, BlackBerry, Palm Pilot, etc.) and an enhancement 204 to collaboration tool (such as Lotus Notes) software 206 for the integration of this new feature. In this system, the collaboration tool 206 communicates with the mobile device 202 for the transmission and receipt of text messages at the mobile device. A user interfaces with both the mobile device and the collaboration tool. In addition, a travel center 208 can be incorporated to provide information about the itinerary of the user. Communication between the travel center and the collaboration tool can be through a communication network 209 such as the Internet or a telephone system. The mobile device can have a display screen to show any received text messages.

However, some mobile devices do not have the capability to automatically show the SMS message when it is received, but instead shows an icon and the user has to enter the "Text Messaging" category of the device in order to view the message. For these telephones, the present invention has two enhancements: 1) A new and differential icon (different color, different shape, etc.) that alerts the user that the incoming message is an enhanced reminder message; and 2) The ability for the differentiated icon to provide a number next to it (either superscript or subscript) in the event the mobile device receives multiple enhanced reminders at the same time. The user will then have to choose which call to connect to when he/she enters the "Text Messaging" category.

The present invention provides a method for automatically connecting users to telephone conference calls. In addition, this method provides the feature of notifying a user when there is change in a scheduled conference call. This change may be the result of activities of the user. The invention provides the option for the user to be notified by SMS on a mobile device of an upcoming conference call/meeting. However, because it is designed to alleviate the problems above where the user is away from the computer, the invention also allows the conference call number and pass code (if required) to be sent as part of the SMS message, and the mobile device software to be enhanced as to provide the following option:

Upon receipt of one of these messages, the enhanced mobile device software would automatically connect to the specified conference call number after some preconfigured time interval, for example 15 seconds. This time interval would be one of the preference settings for the mobile device software.

An additional enhancement provides the integration of the collaboration tool with an employee online travel reservation tool available in many company travel centers (CTC). With this integration, the collaboration tool, upon acceptance of a received meeting invite by the user or after the user has created a new appointment in the calendar, can prompt the user if he/she would like the enhanced reminder. This prompt would occur if the invention detects that the user will be in a new time zone by the time the meeting starts, and if the meeting in that new time zone would be at a time when the user is likely to be away from the computer. For example, a user may have accepted a meeting invite for the following week at 2:30 pm in the user's current time zone. For example, using September 26 as the date the meeting would occur, and also assume the current time zone is Central. However, the week of September 25-September 29, the user is scheduled to be in a different location that is in the Pacific time zone, which is 2 hrs behind Central time zone. Therefore, the meeting on September 26 would occur at 12:30 pm in Pacific Time zone, when the user is likely to be out at lunch. With the integration to the CTC, the collaboration tool would be able to detect that the user is scheduled to be in another location during the week of September 25-September 29, based on the dates that round-trip tickets, hotel reservations, etc. were purchased for, After determining what time zone the new location is in, and what time segment the meeting will fall under in the new time zone, it can prompt the user to be reminded with the enhanced reminder if the time falls under a segment that the user would not normally be in the office. Note that the user would have needed to set up "off-work hours" in the preferences of the collaboration tool, so that the invention can determine if the meeting would fall at an inopportune time Examples of off-work hours would be before 7 am, between 12 pm and 1 pm, or after 7 pm.

Figure 3:
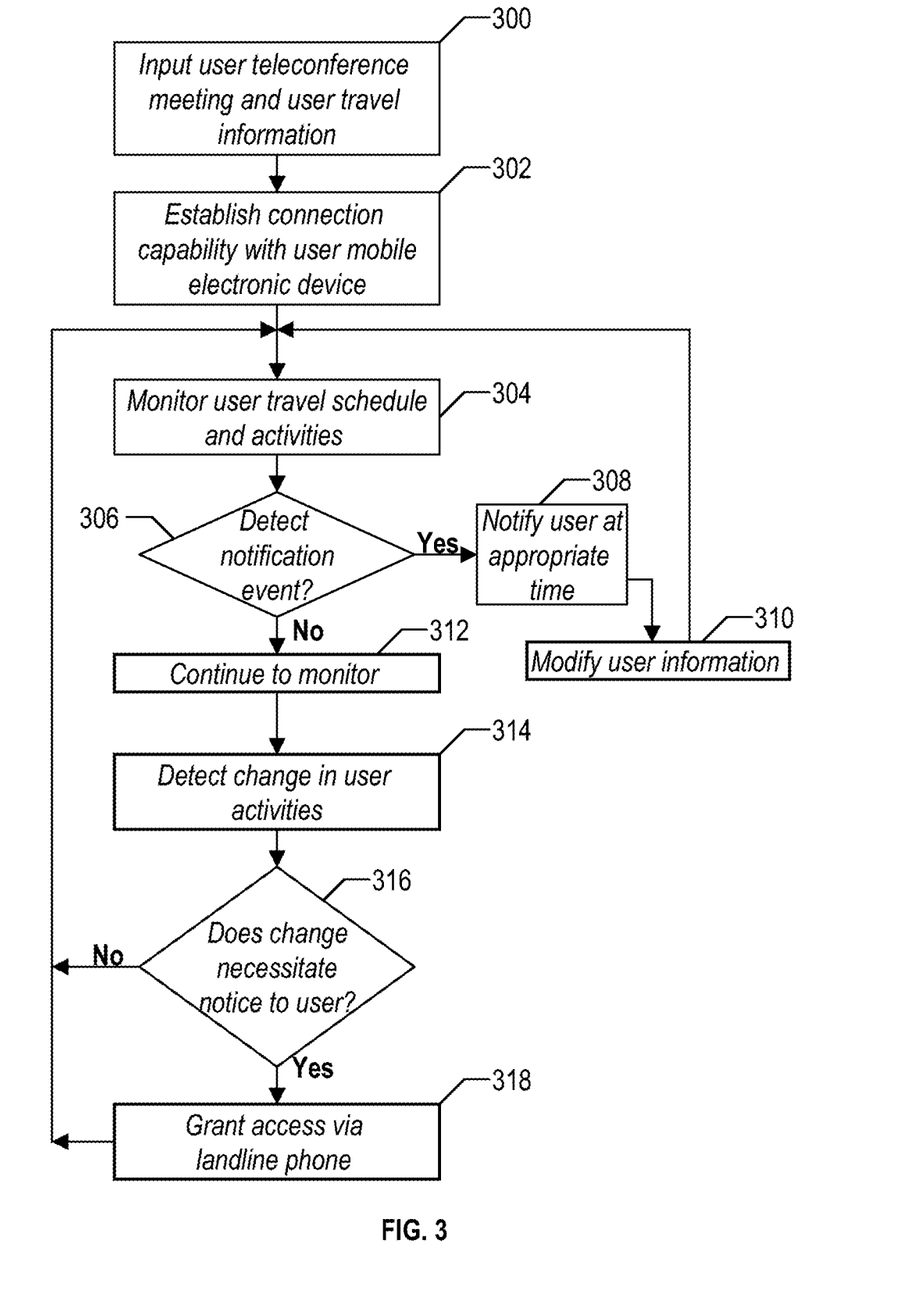
FIG. 3 is a flow diagram of the steps in the implementation of the method of the present invention.

FIG. 3 is a flow diagram of the steps in the implementation of the method of the present invention. The initial step 300 in this method is the receipt of user travel information by the enhanced SMS message storage location such that enhanced SMS software can have access to this information. This location can be in a remote location (at an office facility) or at a network location (on a network server machine). The next step 302 in the method is to verify the capability to establish a connection with a user's mobile electronic device. This connection capability is between the mobile electronic device, the centralized SMSC and the location housing the enhanced software. In some configurations, this location can be the SMSC. The purpose of this step is primarily to ensure that the message can be sent to the mobile electronic device. Following the connection verification step, the method goes into a monitoring state, step 304. In this monitoring step, the method can periodically check for any previously submitted events or new events that may affect a scheduled event/meeting. During the monitoring step, if the time for a scheduled event is detected, step 306 prompts the step 308 to notify the user as previously established. Step 310 then modifies the user's file to remove this event. The process then returns to the monitoring step 304.

Referring back to step 306, if during the periodic check, there is not detection of a scheduled event, the method continues to monitor in step 312. Step 314 detects a change in the user's activities. One such event can be a change in the travel plans of the user such that the user will be in a different time zone than the time zone of the conference host. At this point, step 316 determines whether the detect change necessitates a notice to the user. For example, if the user traveled but remained in the same time zone, this change could be detected, but may not necessitate a notification to the user. If the detected change does not necessitate a notification to the user, the method returns to the monitoring step 304. If in step 316, the detected change does necessitate notifying the user, the user is given an opportunity to modify the stored information. This modification of the information would occur in step 318. After the modification, the method returns to the monitoring step 304 awaiting the next schedule event.

Step 300 calls for the user to provide information about the user itinerary that the system will use to notify the user about an upcoming meeting or conference. Table 1 below is an example of an enhanced SMS Messaging Form, which the user will complete. This table of information is submitted to a software-monitoring program for the purpose of tracking information related to a user's travel schedule. This forms enables a user to provide what, when and where information about the user's activities to the Enhanced SMS software. This information is contained in a stored file for that particular user. As shown, this form is in a table format and can contain various types of information. This table contains four columns. The first column identifies a variable. The second column defines each variable. The data type for each variable is listed in the third column. Finally, the fourth column lists a default value for each variable.

Enhanced SMS Messing Form Variables

| Variable | Definition | Type | Default Value |
|---|---|---|---|
| Automatic Dial | When received on the mobile device should the number automatically be dialed? | Boolean | None must be selected by the user. |
| Automatic Dial Timed Interval | How long after message is received should mobile device attempt to connect to call? | Long (defined in seconds) | 15. Can be selected by the user. Only applicable if automatic dial option was chosen. |
| Test Message Option | Should a test message be sent to the mobile device for validation purposes? | Boolean | No |
| Message Title | A title for the message which will be displayed on the mobile device when the message is received. | String | The title of the meeting notice. Can be selected by the user. |
| Message Description | The message to be sent to the mobile device. | String | None must be selected by the user. |
| Connection ID (Conference calling number | Number to be dialed | Long | None must be selected by the user. |
| Connection Password (pass code) | The password for the meeting | String | Obtained from meeting invite, if available. |
| Time | Date and time message should be sent | Date | None must be selected by the user or calendaring tool. |
| Destination Cellular number | Destination device ID (telephone number or other device identification). | String | None must be selected by the user. |

Figure 4:
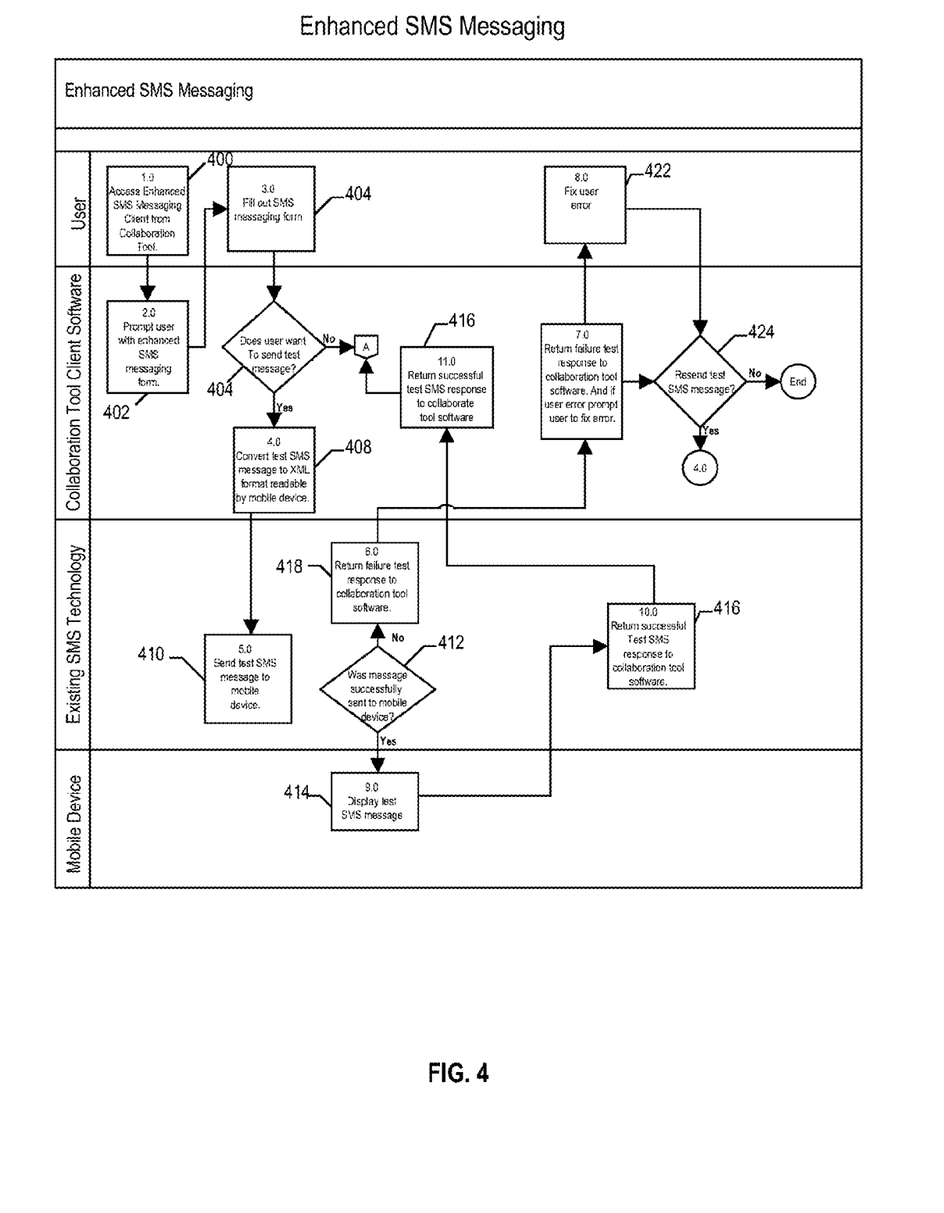
FIG. 4 is a flow diagram of the process for sending an SMS message to a mobile device in the method of the present invention.

Referring again to FIG. 3, step 302 verifies the capability of connecting to a user mobile electronic device. FIG. 4 is a detailed description of this step 302. In the initial step 400, the collaboration tool attempts to access the enhanced SMS Messaging software of the mobile electronic device. Step 402 prompts the user with an enhanced SMS messaging form. This prompt serves to get the user's attention and to alert them to fill out the SMS messaging form in step 404. This process of filling out the SMS messaging form can be an interactive process where the user is prompted to supply information in the requested/necessary fields. Once the user completes the SMS messaging form, the information in this form is stored in a file for that user. Next, the user has the opportunity to send a test message in step 406. If the user does not want to send a test message, the user can indicate this and the process would move to a monitoring and message receipt phase, which is shown in FIG. 5. If the user desires to send a test message, the process moves to step 408 where the SMS test message is converted to an XML format that is readable by the mobile electronic device. In step 410, this converted message is sent as an SMS test message to the mobile device.

At this point, in step 412, there is a determination of whether the test message was successfully sent to the mobile device. If the transmission was successful, the SMS test message is displayed on the electronic device in step 414. At this point, step 416 sends a return successful test SMS response to the collaboration tool software. Since the test message transmission was successful, the process moves to the monitoring state.

Referring again to step 412, if the test message transmission was not successful, a test failure message is generated and sent to the collaboration tool software in step 418. Next step 420 determines whether the error is a user error. If so, the user is prompted to correct the error. In step 422, the user corrects the error. If the determination is that the user has not made an error, or even if the user has made an error, in either case step determines whether or not to resend the test message.

Figure 5:
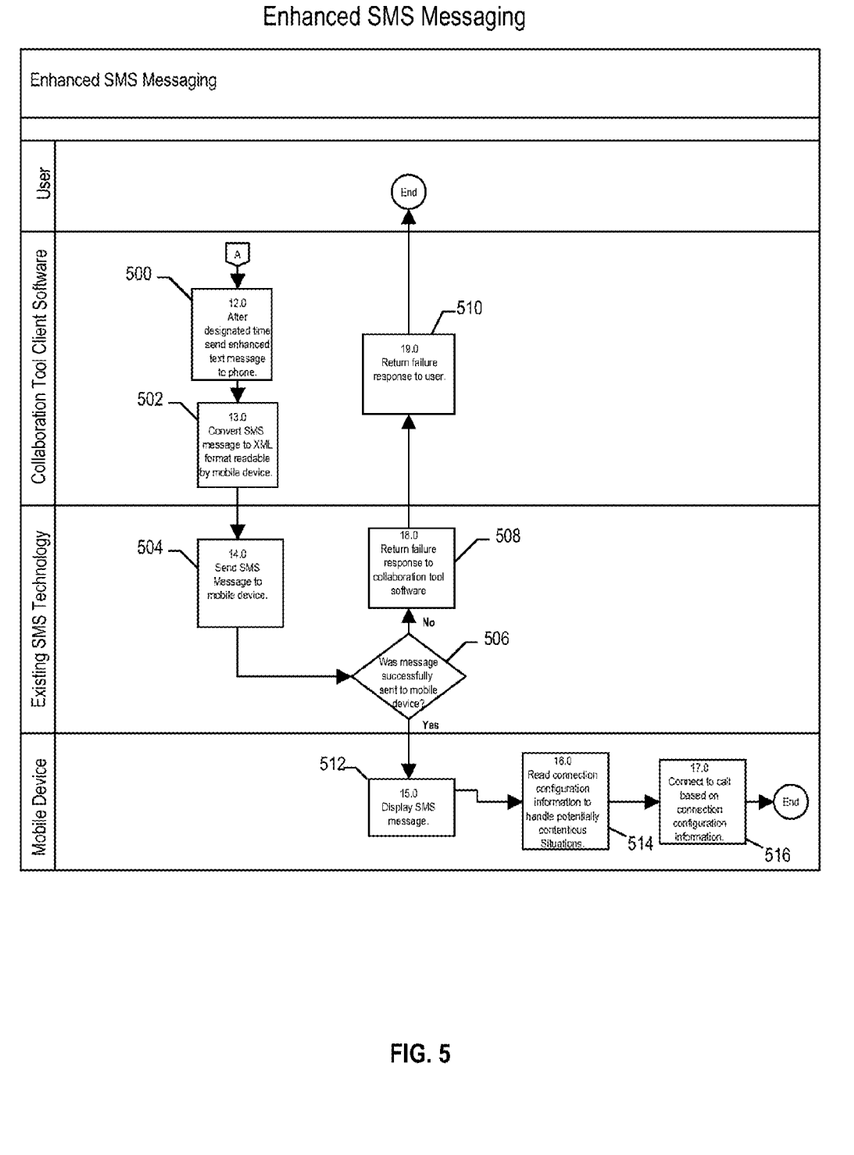
FIG. 5 is a flow diagram of the process for receiving an SMS message at a mobile device in accordance with the method of the present invention.

Referring to step 308, FIG. 5 is a flow diagram of the process for receiving an SMS message at a mobile device in accordance with the method of the present invention. This method in FIG. 5 is a continuation of the method described in FIG. 4. This method of FIG. 5 continues from either step 406 or 416. Both of these steps return successful test SMS responses to the collaboration tool software. In the method of FIG. 5, after a designated time, an enhanced text message is generated to send to the user's mobile electronic device. This message can be any time designated by the user and prior to a scheduled conference. For example, the user may want a reminder of a meeting at 30 minutes prior to the meeting. At the 30 minutes point prior to the meeting, a text message in step 500 would be generated to go out the user's mobile device. Step 502 would convert the transmitted SMS message to an XML format that is readable by the user's mobile device. After the message conversion, step 504 would actually send the SMS message to the user's mobile device.

Once the message is sent, step 506 makes a determination of whether the message was successfully sent to the user's mobile device. If the determination is that the message transmission was not successful, the method moves to step 508 where a return failure response is sent to the collaboration tool software. This failure response message is then sent to the user in step 510 and the process ends.

Referring again to step 506, if the determination is that the message was successfully sent, step 512 displays this message at the user device. In addition to displaying an SMS text message at the user device, the present invention can have the capability to determine in step 514 whether there are multiple messages being simultaneously transmitted to the user device. When there are multiple messages awaiting the user, in step 516 a connection is made to one of the messages.

This selection can be based on the user's discretion or there can be some predetermined method for making the connection. One example of the predetermined approach could be message priority system. Another approach could be in the event the mobile device has received multiple SMS messages to automatically connect to a call at overlapping times, the software will not try to connect to any of the telephone numbers. Instead the software will alert the user of this situation and prompt the user to select which call to which the user wants to connect. In this approach, the user gets the option to select the call.

In another situation when the mobile device has received a message to automatically connect to a call while the user is currently on a call, again, the software will not try to connect to the telephone number. In this case, the software would switch over to a manual mode for the SMS message, thereby giving the user the option to use a one-click option to connect to the call later on if he/she so desires.

In the event the user has received a message to automatically connect to a call, but it comes at an inopportune time, the user can choose to cancel the automatic call process before the time interval has expired. For example, if the user is already in a meeting, the user can cancel the automatic connect before this automatic connect occurs. If the meeting in the collaboration tool gets canceled before the SMS message has been sent, it will not send the SMS message.

Figure 6:
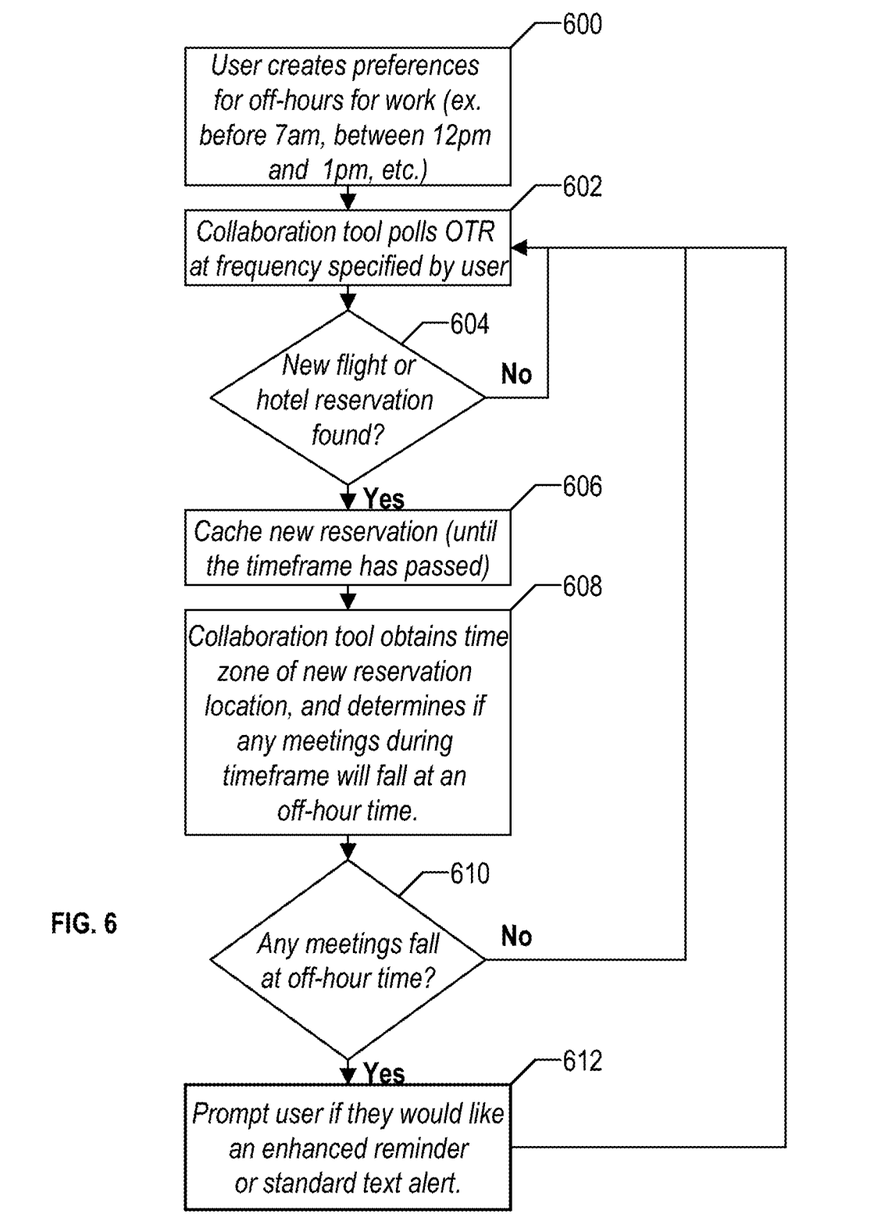
FIG. 6 is a flow diagram of the steps in an online travel reservation process implemented in the present invention.

FIG. 6 is a flow diagram of the steps in an online travel reservation process of a company travel center (CTC) implemented in the present invention. In this process of the present invention, the SMS software can poll or monitor an online travel reservation center for changes in user travel information. Detected changes may be used to query the user with regard to changes in notification preferences for the user. In this process, the user in step 600 creates preferences for off-hours for work. The off-hours are times that the user typically does not want to receive messages. Off-hours could before 7 am or between 12 pm and 1 pm (lunchtime). In step 602, the collaboration tool (monitors) polls the reservation system at frequencies specified by the user. The polling can be hourly, daily weekly etc. Step 604 determines whether a new flight or hotel reservation is found during a polling session. If no new reservation is detected during a particular polling period, the method returns to the polling step 602. If however, in step 604, there is a newly detected reservation, the method moves to step 606, which caches or stores the new reservation until the event covered by that timeframe for that reservation has passed. In step 608, the collaboration tool obtains the time zone of the new reservation location. This step also determines if any meetings during this timeframe will fall at an off-hour time as specified by the user. If no meetings fall at off-hour times, step 610 returns the method to the polling step 602. If in step 610, meetings do fall in this off-hours time, the method moves to step 612, which prompts the user to determine if the user would like an enhanced or standard text message alert.

During the reservation detection step 604, the information provided by the reservation center can comprise the below listed format.

XML Message Response from Reservation System

```
<Response>
    <Type>Flight</Type>
    <StartDate>10/15/2006</StartDate>
    <EndDate>10/20/2006</EndDate>
    <City>Los Angeles</City>
    <StateOrProvince>California</StateOrProvince>
    <Country>US</Country>
</Response>
```

As discussed, the present invention provides novel features over conventional methods of performing text message functions and conventional methods for alerting persons of upcoming telephone conferences. First, this invention has an automated calling after a timed interval. Second, this invention incorporates the use of a new icon with multiplicity factor for phones that use icons to denote new text messages. The new icon would be used to tell the user that this message is a conference call message, as opposed to a message received from a friend. Third, this invention can be integrated with a travel reservation system to detect when the user might want this type of reminder (with the automated calling, or a text alert in general). This would essentially replace box 402 in FIG. 4, so that instead of prompting the user every time if they want the SMS reminder, it would only prompt them when it detects that they would likely be away from their machine at the time of the meeting (if the meeting falls at lunchtime in the new time zone, for example). Note that the user can configure the frequency that the collaboration tool pulls data from the online travel reservation tool, such as nightly, weekly, monthly, etc., according to how often the employee travels. With these novel features, the present invention provides several advantages:

Solves the drawbacks/limitations outlined above with current reminder functionality in collaboration tools.

It's unique. While the ability to send an SMS reminder message currently exists, we have not found the ability to trigger an action on the mobile device upon receipt of an SMS message. In the case of this application, the action would be to [Prior Art—this exists already (hyperlink click in post-disclosure)] automatically connect to the call after some time interval (thus eliminating the need to dial any of the digits at all).

Additionally, we have not seen the integration of a collaboration tool with an online travel reservation tool in the manner specified above.

Buildable—its relatively easy for one skilled in the art of mobile device software to implement the two options above upon receipt of an SMS message. The integration with the reservation system should be likewise straightforward.

An excellent usability enhancement, as it makes it very convenient for the user to connect to the call while away from the computer.

While this detailed description of the invention focuses on a method for automatically connecting to conference calls, there is a broader application and concept of triggering an action on a mobile device upon receipt of an SMS message. A number of follow-on ideas flow from this concept that are also useful. For example, a user may ask his/her friend for the phone number of a third mutual contact via SMS. Upon receipt of the phone number, the mobile device software can be enhanced to detect that a phone number is included in the message and can prompt to connect or automatically connect to the call. It can also prompt the user to store the number if it detects that the number is not already in the contact list. In another example, a user may have read an article that he/she thinks may be interesting to a friend and hence has forwarded it to the friend. Upon receipt of the message, the mobile device software either prompts to connect to the Web on the mobile device or automatically does so after a configured interval.

It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, paper, floppy disc, hard disk drive, RAM, and CD-ROMs and transmission-type of media, such as digital and analog communications links.

We claim:

1. A method, said method comprising:
   receiving, by a computer at a storage location, user information comprising meeting and notification information;
   said computer monitoring user activity based on the received user information;
   in response to a detection of a change in user activity, said computer determining whether the change necessitates notifying a user; and said computer modifying the user information in the storage location, based on the detected change in user activity, when the user desires to change the notification information.

2. The method of claim 1, said method further comprising:
after said modifying the user information, said computer returning to said monitoring user activity.

3. The method of claim 1, said method further comprising:
said computer performing a test message connection between a user mobile electronic device and an SMS center; and
after said performing the test message connection, said computer establishing a connection between a user mobile electronic device and the SMS center.

4. The method of claim 1, said method further comprising:
after said change in user activity is detected, said computer informing the user via an SMS message to determine whether the user wants to change existing notification information, when there is a determination that the change necessitates notifying the user.

5. The method of claim 1, said method further comprising:
after said monitoring user activity, said computer detecting a scheduled conference received for the user and notifying the user via a SMS message of the conference.

6. The method of claim 5, wherein the user notification is at a predetermined time interval prior to the scheduled conference.

7. The method of claim 5, wherein said notifying the user comprises automatically connecting the user to a previously scheduled conference.

8. The method of claim 5, wherein said notifying the user comprises transmitting to the user via a text message a number to call to connect to the conference, the transmitted number being included as part of the text message.

9. The method of claim 5, said method further comprising:
following said notifying the user, detecting at the user mobile electronic device multiple simultaneously received incoming messages for the user and informing the user of the existence of multiple incoming messages.

10. The method of claim 5, said method further comprising after said notifying the user:
detecting whether the user is currently using the user mobile electronic device;
informing the user that an SMS message for a meeting is waiting; and
prompting the user to decide whether to connect to the call or whether to connect at a later time.

11. The method of claim 5, said method further comprising:
after said notifying the user, reading a conference telephone number from the SMS message and connecting to a scheduled conference by calling the read conference telephone number from the SMS message.

12. The method of claim 1, wherein the user information further comprises travel information, and wherein said monitoring user activity comprises monitoring an online travel center for changes in user activity that affects the user's current meeting schedule.

13. A computer program product, comprising a computer readable hardware storage device having computer readable instructions stored therein, said instructions executable by a computer to implement a method, said method comprising:
said computer receiving, at a storage location, user information comprising meeting and notification information;
said computer monitoring user activity based on the received user information;
in response to a detection of a change in user activity, said computer determining whether the change necessitates notifying a user; and
said computer modifying the user information in the storage location, based on the detected change in user activity, when the user desires to change the notification information.

14. The computer program product of claim 13, said method further comprising:
after said modifying the user information, said computer returning to said monitoring user activity.

15. The computer program product of claim 13, said method further comprising:
said computer performing a test message connection between a user mobile electronic device and an SMS center; and
after said performing the test message connection, said computer establishing a connection between a user mobile electronic device and the SMS center.

16. The computer program product of claim 13, said method further comprising:
after said monitoring user activity, said computer detecting a scheduled conference received for the user and notifying the user via a SMS message of the conference.

17. A system, comprising a computer and a computer readable hardware storage device having computer readable instructions stored therein, said instructions configured to be executed by the computer to implement a method for notifying users of events, said method comprising:
said computer receiving, at a storage location, user information comprising meeting and notification information;
said computer monitoring user activity based on the received user information;
in response to a detection of a change in user activity, said computer determining whether the change necessitates notifying a user; and
said computer modifying the user information in the storage location, based on the detected change in user activity, when the user desires to change the notification information.

18. The system of claim 17, said method further comprising:
said computer performing a test message connection between a user mobile electronic device and an SMS center; and
after said performing the test message connection, said computer establishing a connection between a user mobile electronic device and the SMS center.

19. The system of claim 18, said method further comprising:
after said change in user activity is detected, said computer notifying the user via an SMS message to determine whether the user wants to change existing notification information, when there is a determination that the change necessitates notifying the user.

20. The system of claim 17, wherein the user information further comprises travel information, and wherein said monitoring user activity comprises monitoring an online travel center for changes in user activity that affects the user's current meeting schedule.

* * * * *